(12) United States Patent
Infantini et al.

(10) Patent No.: US 12,386,353 B2
(45) Date of Patent: Aug. 12, 2025

(54) SYSTEM AND METHOD FOR AN AGRICULTURAL HARVESTER

(71) Applicant: CNH Industrial America LLC, New Holland, PA (US)

(72) Inventors: Mauricio B. Infantini, Sorocaba (BR); Joao Augusto Marcolin Lucca, Piracicaba (BR); Andre Satoshi Seki, Sorocaba (BR); Arthur Weschenfelder D'Avila, Florianópolis (BR); Renato Ferreira Simão, Florianópolis (BR); Luciano Campos Rodrigues, Florianópolis (BR); Alexandre Reeberg De Mello, Florianópolis (BR); Patryk Alexandre Goncalves, Florianópolis (BR); Henrique Roos Baltezan, Florianópolis (BR)

(73) Assignee: CNH Industrial America LLC, New Holland, PA (US)

( * ) Notice: Subject to any disclaimer, the term of this patent is extended or adjusted under 35 U.S.C. 154(b) by 82 days.

(21) Appl. No.: 18/457,746

(22) Filed: Aug. 29, 2023

(65) Prior Publication Data

US 2024/0069551 A1 Feb. 29, 2024

(30) Foreign Application Priority Data

Aug. 31, 2022 (BR) ...................... 10 2022 017461 0

(51) Int. Cl.
*G06V 20/56* (2022.01)
*G05D 1/00* (2006.01)

(52) U.S. Cl.
CPC .......... *G05D 1/0212* (2013.01); *G06V 20/56* (2022.01)

(58) Field of Classification Search
CPC ........................... G05D 1/0212; G06V 20/56
See application file for complete search history.

(56) References Cited

U.S. PATENT DOCUMENTS

| | | | |
|---|---|---|---|
| 9,961,833 B2 | 5/2018 | Halmann | |
| 2019/0146426 A1 | 5/2019 | Blank | |
| 2020/0090094 A1 | 3/2020 | Blank | |
| 2021/0015045 A1 | 1/2021 | Vandike et al. | |

FOREIGN PATENT DOCUMENTS

| | | |
|---|---|---|
| CN | 211090704 U | 7/2020 |
| WO | WO2019/44304 A1 | 3/2019 |

*Primary Examiner* — Mathew Franklin Gordon
(74) *Attorney, Agent, or Firm* — Dority & Manning, P.A.

(57) ABSTRACT

A system for an agricultural harvester includes one or more processors and one or more non-transitory computer-readable media that stores a machine-learned mass estimation model configured to receive data associated with one or more operation-related conditions for an agricultural harvester and process the data to determine an output indicative of a stalk mass for the agricultural harvester. The one or more non-transitory computer-readable media also stores instructions that, when executed by the one or more processors, configure the computing system to perform operations. The operations include obtaining the data associated with one or more operation-related conditions; inputting the data into the machine-learned mass estimation model; and receiving a value for the stalk mass as the output of the machine-learned mass estimation model for a defined time period.

20 Claims, 8 Drawing Sheets

SYSTEM AND METHOD FOR AN AGRICULTURAL HARVESTER

CROSS-REFERENCE TO RELATED APPLICATION

This application claims the benefit of priority to Brazilian Patent Application No. BR 10 2022 017461 0, entitled "SYSTEM AND METHOD FOR AN AGRICULTURAL HARVESTER," filed on Aug. 31, 2022, and the disclosure of which is incorporated by reference herein in its entirety.

FIELD OF THE INVENTION

The present disclosure relates generally to agricultural harvesters, such as sugarcane harvesters, and, more particularly, to systems and methods for monitoring operational conditions of the agricultural harvester.

BACKGROUND OF THE INVENTION

Typically, agricultural harvesters include an assembly of processing components for processing harvested crops. For instance, within a sugarcane harvester, severed sugarcane stalks are conveyed via a feed roller assembly to a chopper assembly that cuts or chops the sugarcane stalks into pieces or billets (e.g., six-inch cane sections). The processed crop discharged from the chopper assembly is then directed as a stream of billets and debris into a primary extractor, within which the airborne debris (e.g., dust, dirt, leaves, etc.) is separated from the sugarcane billets. The separated/cleaned billets then fall into an elevator assembly for delivery to an external storage device. In some cases, a secondary extractor may remove additional airborne debris (e.g., dust, dirt, leaves, etc.) before the remaining harvested material is delivered to the external storage device.

During the operation of the harvester, an amount of processed crop may be difficult to monitor. Accordingly, systems and methods for monitoring the amount of processed crops during the harvest operation would be welcomed in the technology.

BRIEF DESCRIPTION OF THE INVENTION

Aspects and advantages of the invention will be set forth in part in the following description, or may be obvious from the description, or may be learned through practice of the invention.

In some aspects, the present subject matter is directed to a system for an agricultural harvester. The system includes one or more processors. The system further includes one or more non-transitory computer-readable media that collectively store a machine-learned mass estimation model configured to receive data associated with one or more operation-related conditions for an agricultural harvester and process the data to determine an output indicative of a stalk mass for the agricultural harvester and instructions that, when executed by the one or more processors, configure the system to perform operations The operations include obtaining the data associated with one or more operation-related conditions; inputting the data into the machine-learned mass estimation model; and receiving a stalk mass as the output of the machine-learned mass estimation model for a defined time period.

In some aspects, the present subject matter is directed to a computer-implemented method for agricultural harvesting. The computer-implemented method includes receiving, by a computing system, a first image including a harvested material being represented by a plurality of pixels, the harvested material including debris and stalks, wherein the first image is associated with a first region of an elevator for an agricultural harvester. The method also includes generating, with the computing system, a harvested material mask, which may represent and/or be configured to contain the harvesting material while excluding the machine parts. The method further includes segmenting, by the computing system, the harvested material mask into one or more subsets, which may be accomplished with a computer vision/machine learning based model. In various examples, the one or more subsets can include a first subset representing the stalks within the harvested material, a second subset representing the debris within the harvested material, and/or a third subset representing the remaining machine parts (i.e., a portion of the selected mask that is not a harvested material). Lastly, the method includes calculating, through the model and/or an additional model, a stalk mass of the harvested material based on the amount of pixels within each subset.

In some aspects, the present subject matter is directed to a system for an agricultural harvester. The system includes a frame and a material processing system supported relative to the frame and configured to process a flow of harvested material. A sensor assembly is configured to capture image associated with the harvested material. A computing system includes one or more processors and one or more non-transitory computer-readable media that collectively store instructions that, when executed by the one or more processors, configure the computing system to perform operations. The operations include obtaining the image associated with one or more operation-related conditions and determining a stalk mass of the harvested material.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
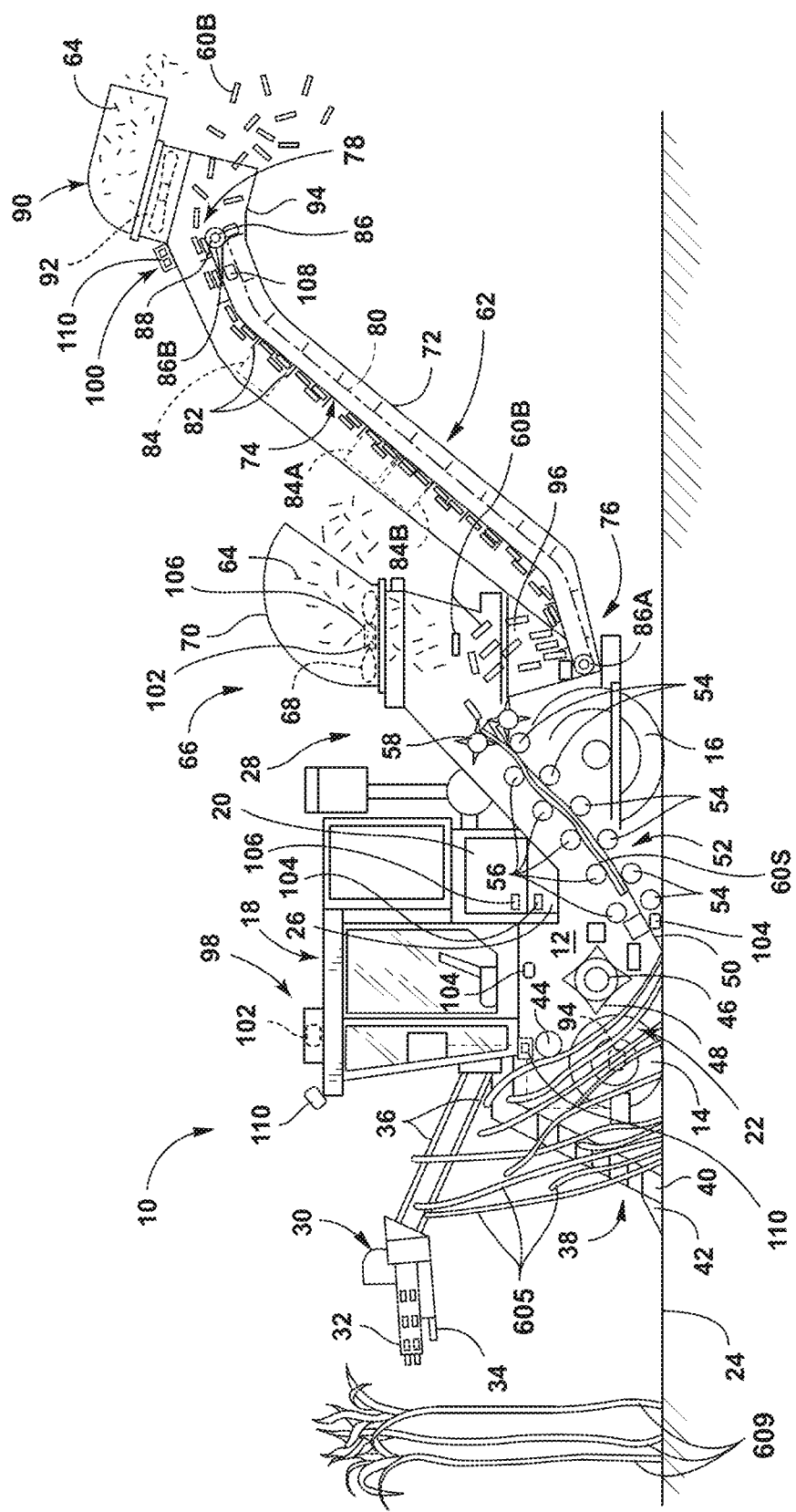
FIG. 1 illustrates a simplified, side view of an agricultural harvester in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part can be used with another embodiment to yield a still further embodiment. Thus, it is intended that the present invention covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a crop within a fluid circuit. For example, "upstream" refers to the direction from which a crop flows, and "downstream" refers to the direction to which the crop moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein will be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to systems and methods for agricultural harvesters. In particular, the present subject matter is directed to systems and methods that can include or otherwise leverage an operation model, which may be a machine-learned operation model, to determine a value for a harvest-related parameter for an agricultural harvester based at least in part on input data associated with one or more operation-related conditions for the harvester.

In some examples, a computing system can obtain input data from one or more input devices that is associated with one or more operation-related conditions for an agricultural harvester. For instance, the input device(s) may include one or more onboard sensors configured to monitor one or more parameters and/or conditions associated with the harvester, one or more positioning device(s) for generating position data associated with the location of the harvester, one or more user interfaces for allowing operator inputs to be provided to the system, one or more other internal data sources associated with the harvester, one or more external data sources, and/or the like. The computing system can input the data generated or collected by the input device(s) into a mass estimation model and, in response, generate a harvest-related parameter as an output of the model. For example, the mass estimation model can be configured to receive input data, which may include or be based on an image associated with a region of an elevator. The region of the elevator may define a space generally encompassing harvested material positioned within the defined space and translated through an elevator assembly by an elevator. Further, the harvested material can include stalks (or collected crop) and debris, which may be any object other than the stalk (or the collected crop). The mass estimation model can further be configured to process the input data to determine a mass of the harvested material, or a defined subset of the harvested material (e.g., the stalks and/or the debris), during a defined time period. Based on the mass, one or more control actions may be initiated. For example, the one or more control actions can include causing data associated with the stalk mass to be presented to an operator via a user interface of the agricultural harvester, generating a yield map based at least in part on the stalk mass, automatically controlling an operation of a component of the agricultural harvester based at least in part on the stalk mass, and/or any other action. Through the use of the systems and methods provided herein, an operator may receive more visibility as to the results of a harvesting operation during the harvesting operation.

Referring now to the drawings, FIG. 1 illustrates a side view of an agricultural harvester 10 in accordance with aspects of the present subject matter. As shown, the harvester 10 is configured as a sugarcane harvester. However, in other embodiments, the harvester 10 may correspond to any other suitable agricultural harvester known in the art.

As shown in FIG. 1, the harvester 10 can include a frame 12, a pair of front wheels 14, a pair of rear wheels 16, and an operator's cab 18. The harvester 10 may also include a power source 20 (e.g., an engine mounted on the frame 12) that powers one or both pairs of the wheels 14, 16 via a driveline assembly 22 (e.g., a transmission) to traverse a field 24. Alternatively, the harvester 10 may be a track-driven harvester and, thus, may include tracks driven by the power source 20 as opposed to the illustrated wheels 14, 16. The power source 20 may also drive a hydraulic fluid pump 26 configured to generate pressurized hydraulic fluid for a hydraulic circuit, which may be configured to power various components of the harvester 10, including the driveline assembly 22.

The harvester 10 may also include a crop processing system 28 incorporating various components, assemblies, and/or sub-assemblies of the harvester 10 for cutting, processing, cleaning, and discharging sugarcane as the cane is harvested from an agricultural field 24. For instance, the crop processing system 28 may include a topper assembly 30 positioned at the front end portion of the harvester 10 to intercept sugarcane as the harvester 10 is moved in a forward direction. As shown, the topper assembly 30 may include both a gathering disk 32 and a cutting disk 34. The gathering disk 32 may be configured to gather the sugarcane stalks 60S so that the cutting disk 34 may be used to cut off the top of each stalk 60S. As is generally understood, the height of the topper assembly 30 may be adjustable via a pair of arms 36, which may be hydraulically raised and lowered.

The crop processing system 28 may further include a crop divider 38 that extends upwardly and rearwardly from the field 24. In general, the crop divider 38 may include two spiral feed rollers 40. Each feed roller 40 may include a ground shoe 42 at its lower end portion to assist the crop divider 38 in gathering the sugarcane stalks 60S for harvesting. Moreover, as shown in FIG. 1, the crop processing system 28 may include a knock-down roller 44 positioned near the front wheels 14 and a fin roller 46 positioned behind the knock-down roller 44. As the knock-down roller 44 is rotated, the sugarcane stalks 60S being harvested are knocked down while the crop divider 38 gathers the stalks 60S from agricultural field 24. Further, as shown in FIG. 1, the fin roller 46 may include a plurality of intermittently mounted fins 48 that assist in forcing the sugarcane stalks 60S downwardly. As the fin roller 46 is rotated during the harvest, the sugarcane stalks 60S that have been knocked down by the knock-down roller 44 are separated and further knocked down by the fin roller 46 as the harvester 10 continues to be moved in the forward direction relative to the field 24.

Referring still to FIG. 1, the crop processing system 28 of the harvester 10 may also include a base cutter assembly 50 positioned behind the fin roller 46. The base cutter assembly 50 may include blades for severing the sugarcane stalks 60S as the cane is being harvested. The blades, which may be located on a periphery section of the base cutter assembly 50, may be rotated by the hydraulic circuit. Additionally, in several embodiments, the blades may be angled downwardly to sever the base of the sugarcane as the cane is knocked down by the fin roller 46.

Moreover, the crop processing system 28 may include a feed roller assembly 52 located downstream of the base cutter assembly 50 for moving the severed stalks 60S of sugarcane from base cutter assembly 50 along the processing path of the crop processing system 28. As shown in FIG. 1, the feed roller assembly 52 may include a plurality of bottom rollers 54 and a plurality of opposed, top rollers 56. The various bottom and top rollers 54, 56 may be used to pinch the harvested sugarcane during transport. As the sugarcane is transported through the feed roller assembly 52, debris (e.g., rocks, dirt, and/or the like) may be allowed to fall through bottom rollers 54 onto the field 24.

In addition, the crop processing system 28 may include a chopper assembly 58 located at the downstream end section of the feed roller assembly 52 (e.g., adjacent to the rearward-most bottom roller 54 and the rearward-most top roller 56). In general, the chopper assembly 58 may be used to cut or chop the severed sugarcane stalks 60S into pieces or "billets" 60B, which may be, for example, six (6) inches long. The billets 60B may then be propelled towards an elevator assembly 62 of the crop processing system 28 for delivery to an external receiver or storage device.

The pieces of debris 64 (e.g., dust, dirt, leaves, etc.) separated from the sugarcane billets 60B may be expelled from the harvester 10 through a primary extractor 66 of the crop processing system 28, which may be located downstream of the chopper assembly 58 and may be oriented to direct the debris 64 outwardly from the harvester 10. Additionally, an extractor fan 68 may be mounted within an extractor housing 70 of the primary extractor 66 for generating a suction force or vacuum sufficient to force the debris 64 through the primary extractor 66. The separated or cleaned billets 60B, which may be heavier than the debris 64 expelled through the extractor 66, may then fall downward to the elevator assembly 62.

As shown in FIG. 1, the elevator assembly 62 may include an elevator housing 72 and an elevator 74 extending within the elevator housing 72 between a lower, proximal end portion 76 and an upper, distal end portion 78. In some examples, the elevator 74 may include a looped chain 80 and a plurality of flights or paddles 82 attached to and spaced on the chain 80. The paddles 82 may be configured to hold the sugarcane billets 60B on the elevator 74 as the sugarcane billets 60B are elevated along a top span of the elevator 74 defined between its proximal and distal end portions 76, 78. A region 84 for retaining the harvested material may be defined between first and second paddles 82 operably coupled with the elevator 74. As such, a first region 84A may be defined between first and second paddles 82, a second region 84B may be defined between the second and a third paddle 82, and so on. Additionally, the elevator 74 may include lower and upper sprockets 86A, 86B positioned at its proximal and distal end portions 76, 78, respectively. As shown in FIG. 1, an elevator motor 88 may be coupled to one of the sprockets (e.g., the upper sprocket 86B) for driving the chain 80, thereby allowing the chain 80 and the paddles 82 to travel in a loop between the proximal and distal ends 76, 78 of the elevator 74.

Moreover, in some embodiments, pieces of debris 64 (e.g., dust, dirt, leaves, etc.) separated from the elevated sugarcane billets 60B may be expelled from the harvester 10 through a secondary extractor 90 of the crop processing system 28 coupled to the rear end portion of the elevator housing 72. For example, the debris 64 expelled by the secondary extractor 90 may be debris 64 remaining after the billets 60B are cleaned and debris 64 expelled by the primary extractor 66. As shown in FIG. 1, the secondary extractor 90 may be located adjacent to the distal end portion 78 of the elevator 74 and may be oriented to direct the debris 64 outwardly from the harvester 10. Additionally, an extractor fan 92 may be mounted at the base of the secondary extractor 90 for generating a suction force or vacuum sufficient to force the debris 64 through the secondary extractor 90. The separated, cleaned billets 60B, heavier than the debris 64 expelled through the primary extractor 66, may then fall from the distal end portion 78 of the elevator 74. In some instances, the billets 60B may fall through an elevator discharge opening 94 defined by the elevator assembly 62 into an external storage device, such as a sugarcane billet cart.

During operation, the harvester 10 traverses the agricultural field 24 for harvesting sugarcane. After the height of the topper assembly 30 is adjusted via the arms 36, the gathering disk 32 on the topper assembly 30 may function to gather the sugarcane stalks 60S as the harvester 10 proceeds across the field 24, while the cutting disk 34 severs the leafy tops of the sugarcane stalks 60S for disposal along either side of harvester 10. As the stalks 60S enter the crop divider 38, the ground shoes 42 may set the operating width to determine the quantity of sugarcane entering the throat of the harvester 10. The spiral feed rollers 40 then gather the stalks 60S into the throat to allow the knock-down roller 44 to bend the stalks 60S downwardly in conjunction with the action of the fin roller 46. Once the stalks 60S are angled downward as shown in FIG. 1, the base cutter assembly 50 may then sever the base of the stalks 60S from field 24. The severed stalks 60S are then, by the movement of the harvester 10, directed to the feed roller assembly 52.

The severed sugarcane stalks 60S are conveyed rearwardly by the bottom and top rollers 54, 56, which compresses the stalks 60S, makes them more uniform, and shakes loose debris 64 to pass through the bottom rollers 54 to the field 24. At the downstream end portion of the feed roller assembly 52, the chopper assembly 58 cuts or chops the compressed sugarcane stalks 60S into pieces or billets 60B (e.g., 6-inch cane sections). The processed crop discharged from the chopper assembly 58 is then directed as a stream of billets 60B and debris 64 into the primary extractor 66. The airborne debris 64 (e.g., dust, dirt, leaves, etc.) separated from the billets 60B is then extracted through the primary extractor 66 using suction created by the extractor fan 68. The separated/cleaned billets 60B then be directed to an elevator hopper 96 into the elevator assembly 62 and travel upwardly via the elevator 74 from its proximal end portion 76 to its distal end portion 78. During normal operation, once the billets 60B reach the distal end portion 78 of the elevator 74, the billets 60B fall through the elevator discharge opening 94 to an external storage device. If provided, the secondary extractor 90 (with the aid of the extractor fan 92) blows out trash/debris 64 from the harvester 10, similar to the primary extractor 66.

In various examples, the harvester 10 may also include a sensor system 98 including one or more sensor assemblies 100 each including various onboard sensor(s) for monitoring one or more operating parameters or conditions of the harvester 10. For instance, the one or more sensor assemblies 100 may include or be associated with various different speed sensors 102 for monitoring the speed of the harvester 10, and/or the operating speed of one or more components of the harvester 10. In several embodiments, the speed sensors 102 may be used to detect or monitor various different speed-related parameters associated with the harvester 10, including, but not limited to, the ground speed of the harvester 10, the engine speed of the harvester's engine (e.g., engine RPM), the elevator speed of the elevator assembly 62, the rotational speed of the blades of the base cutter assembly 50, the rotational speed of the chopper assembly 58, the rotational speed of the rollers 54, 56 of the feed roller assembly 52, the fan speed associated with the primary extractor 66 and/or the secondary extractor 90, and/or any other suitable operating speeds associated with the harvester 10. For example, as shown in FIG. 1, a first speed sensor 102 is provided in operative association with the primary extractor 66 (e.g., a rotational speed sensor provided in association with the elevator motor 88) to allow the fan speed to be monitored, while a second speed sensor 102 (e.g., a wheel speed sensor or a GPS-enabled device) may be provided in operative association with another component of the harvester 10 (e.g., the wheels 14, 16 and/or cab 18) to allow the ground speed of the harvester 10 to be continuously monitored.

Additionally, in several embodiments, the one or more sensor assemblies 100 may include or incorporate one or more position sensors 104 used to monitor one or more corresponding position-related parameters associated with the harvester 10. Position-related parameters that may be monitored via the position sensor(s) 104 include, but are not limited to, the cutting height of the base cutter assembly 50, the relative positioning of the bottom and top rollers 54, 56 of the feed roller assembly 52, the vertical travel or position of the chassis or frame 12 of the harvester 10, and/or any other suitable position-related parameters associated with the harvester 10. For instance, as shown in FIG. 1, a position sensor 104 may be mounted to the harvester's frame 12 to monitor the vertical position or travel of the chassis relative to a given reference point.

Moreover, in several embodiments, the one or more sensor assemblies 100 may include or incorporate one or more pressure sensors 106 used to monitor one or more corresponding pressure-related conditions or parameters associated with the harvester 10. For instance, pressure-related conditions or parameters that may be monitored via the pressure sensor(s) 106 include, but are not limited to, the fluid pressures associated with the hydraulic fluid supplied to one or more hydraulic components of the harvester 10, such as hydraulic motor(s) rotationally driving the base cutter assembly 52 (e.g., the base cutter pressure), hydraulic motor(s) rotationally driving the feed roller assembly 50, hydraulic motor(s) rotationally driving the chopper assembly 58, hydraulic motor(s) rotationally driving the fan 68 of the primary extractor 66, hydraulic motor(s) rotationally driving the elevator assembly 62, hydraulic motor(s) rotationally driving the secondary extractor 90, and/or any other suitable pressure-related conditions or parameters associated with the harvester 10. For instance, as shown in FIG. 1, a pressure sensor 106 may be provided in operative association with the base cutter assembly 50 to monitor the base cutter pressure.

It will be appreciated that the one or more sensor assemblies 100 may also include various other sensors or sensing devices. In some embodiments, the harvester 10 may include or incorporate one or more load sensors 108 (e.g., one or more load cells or sensorized load plates) used to monitor one or more corresponding load-related conditions or parameters associated with the harvester 10. For instance, as shown in FIG. 1, one or more load sensors 108 may be provided in operative association with the elevator assembly 62 to allow the weight or mass flow rate of the crops being directed through the elevator 74 to be monitored.

Additionally, in some embodiments, the sensor assembly 100 may include or incorporate one or more vision-based or wave-based sensors 110 (e.g., one or more cameras, radar sensors, ultrasound sensors, LIDAR devices, etc.) used to capture sensor data indicative of one or more observable conditions or parameters associated with the harvester 10, such as by providing a camera or LIDAR device to allow the potential upcoming stalk mass within the field 24 to be estimated based on the received vision-based data (e.g., image(s)) or by providing an internally installed camera or radar device to allow sensor data to be captured that is associated with the detected foliage ratio of the crops at the elevator 74 and/or within any of location of the harvester 10 and/or the mass of the harvested material through the crop processing system 28. For instance, as shown in FIG. 1, a forward looking vision-based sensor 110 may be installed on the cab 18 with a field of view directed in front of the harvester 10 to allow images or other vision-based data to be captured that provides an indication of the upcoming stalk mass within the field 24. Additionally or alternatively, as shown in FIG. 1, a vision-based sensor 110 may be installed proximate to the knock-down roller 44 with a field of view directed towards an infeed location of the crop entering the harvester 10 to allow images or other vision-based data to be captured that provides an indication of the upcoming stalk mass within the field 24. Additionally or alternatively, as shown in FIG. 1, one or more vision-based sensors 110 may be installed proximate to the elevator housing 72 with a field of view directed towards the elevator 74 to allow images or other vision-based data to be captured that provide an indication of the debris 64 and/or stalks 60S, or billets 60B, (i.e., detected foliage ratio) downstream of the primary extractor 66.

Figure 2:
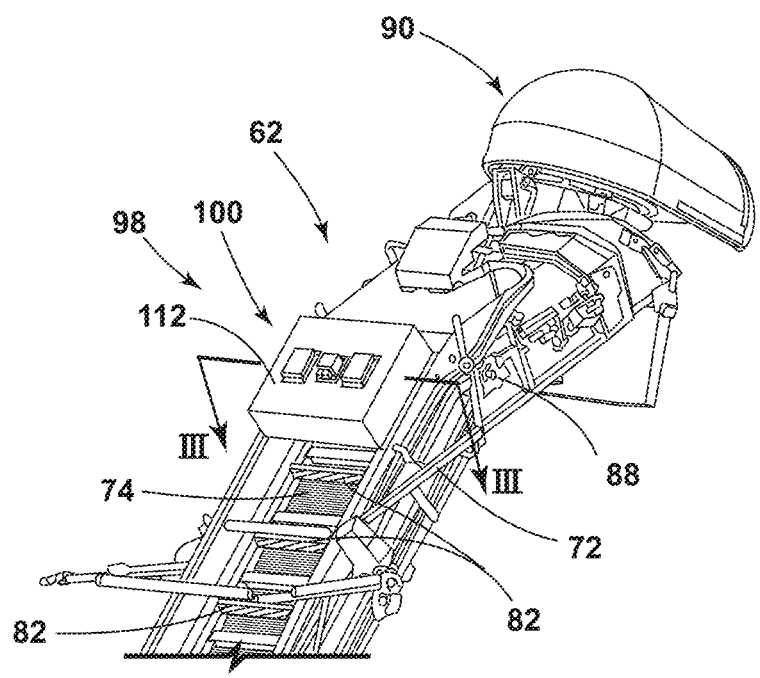
FIG. 2 illustrates a perspective view of a rear portion of the agricultural harvester in accordance with aspects of the present subject matter.
Figure 3:
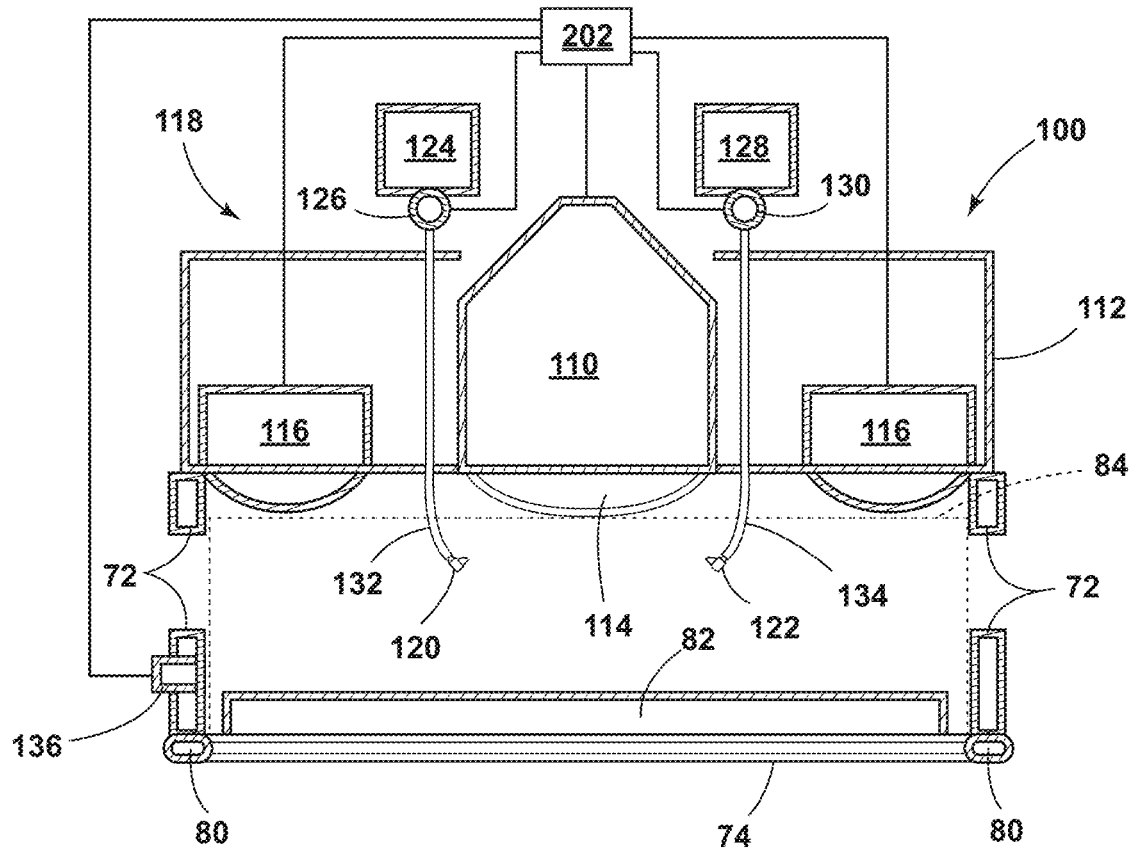
FIG. 3 illustrates a cross-sectional view taken along the line III-III of FIG. 2.

Referring now to FIGS. 2 and 3, a perspective view of a rear portion of the agricultural harvester 10 and a cross section taken along the line III-III of FIG. 2 are respectively illustrated in accordance with aspects of the present subject. As shown, a sensor assembly 100 of the sensor system 98 may be operably coupled with the elevator housing 72. The sensor assembly 100 may include a sensor housing 112 and one or more vision-based sensors 110 installed within the housing 72 that is coupled with a computing system 202.

The one or more vision-based sensors 110 may have a lens 114 producing a field of view directed towards the elevator 74 to allow images or other vision-based data to be captured that provides an indication of the debris 64 and/or stalks 60S, or billets 60B, downstream of the primary extractor 66. In various examples, each of the one or more vision-based sensors 110 may be configured as an area-type image sensor, such as a CCD or a CMOS image sensor, and image-capturing optics that capture an image of an imaging field. In various embodiments, the image sensor may correspond to a stereographic camera having two or more lenses with a separate image sensor for each lens 114 to allow the camera to capture stereographic or three-dimensional images.

The one or more light sources 116 may be operably coupled with the computing system 202 and configured to illuminate an area within the field of view of the one or more vision-based sensors 110. The one or more light sources 116 may be any lighting apparatuses suitable for illuminating a portion of the elevator 74, such as light-emitting diodes (LED), tungsten-based light sources, halogen-based light sources, high-intensity discharge (HID) sources, such as xenon, laser-based light sources, vertical-cavity surface-emitting laser-based light sources (VCSEL), etc. In some instances, the one or more light sources can be near-infrared (NIR) lamps positioned near the sensors 110 to illuminate the environment in low-light conditions for the sensors 110.

In addition, the sensor assembly 100 may further include a cleaning system 118 that is configured to provide a liquid and/or pressurized air on the lens 114. In the example illustrated in FIG. 3, the cleaning system 118 includes a liquid nozzle 120, an air nozzle 122, a liquid tank 124, a liquid pump 126, a compressed air tank 128, and/or an air pump 130. The liquid in the liquid tank 124 is pumped by the liquid pump 126 through a pipe 132 and the liquid nozzle 120. The pumped liquid is exhausted from the liquid nozzle 120 of the sensor assembly 100 toward the lens 114. Similarly, air may be released from the compressed air tank 128 and/or from the air pump 130 to the air nozzle 122 through tubing 134. In operation, when a cleaning routine is initiated, the computing system 202 may activate the liquid pump 126 thereby directing fluid from the liquid tank through the liquid nozzle 120 to direct liquid at the lens 114 of the vision-based sensor 110. The computing system 202 may deactivate the fluid pump and activate the air pump 130 to direct air through the air nozzle 122 and towards the lens 114. Additionally or alternatively, the computing system 202 may be capable of various cleaning routines that include spraying air and liquid contemporaneously and/or successively at the lens 114, just liquid at the lens 114, and/or just air at the lens 114.

With further reference to FIG. 3, the sensor assembly 100 may include a movement sensor 136, such as a proximity sensor, which may be configured to detect when a component of the harvester 10, such as a paddle 82 on the elevator 74, changes position relative to the movement sensor 136. As such, while the elevator 74 is in motion, the movement sensor 136 may detect a time between paddles 82 passing thereby and/or quantify the speed of the elevator 74 and various regions 84 associated with the elevator 74 in any other manner.

As such, in some instances, the computing system 202 may be capable of obtaining the image associated with one or more operation-related conditions; and determining a stalk mass of a crop portion of the harvested material. In some cases, determining the stalk mass of the crop portion of the harvested material can include calculating the stalk mass based on a model, wherein a proportion of pixels within an image that corresponds to a crop portion of a harvested material is an input of the model. In addition, the computing system 202 may detect one or more objects on a lens 114 of the vision-based sensor 110 of the sensor assembly 100 and initiate a cleaning routine when the proportion of the lens 114 having objects adhered thereto exceeds the defined threshold.

Figure 4:
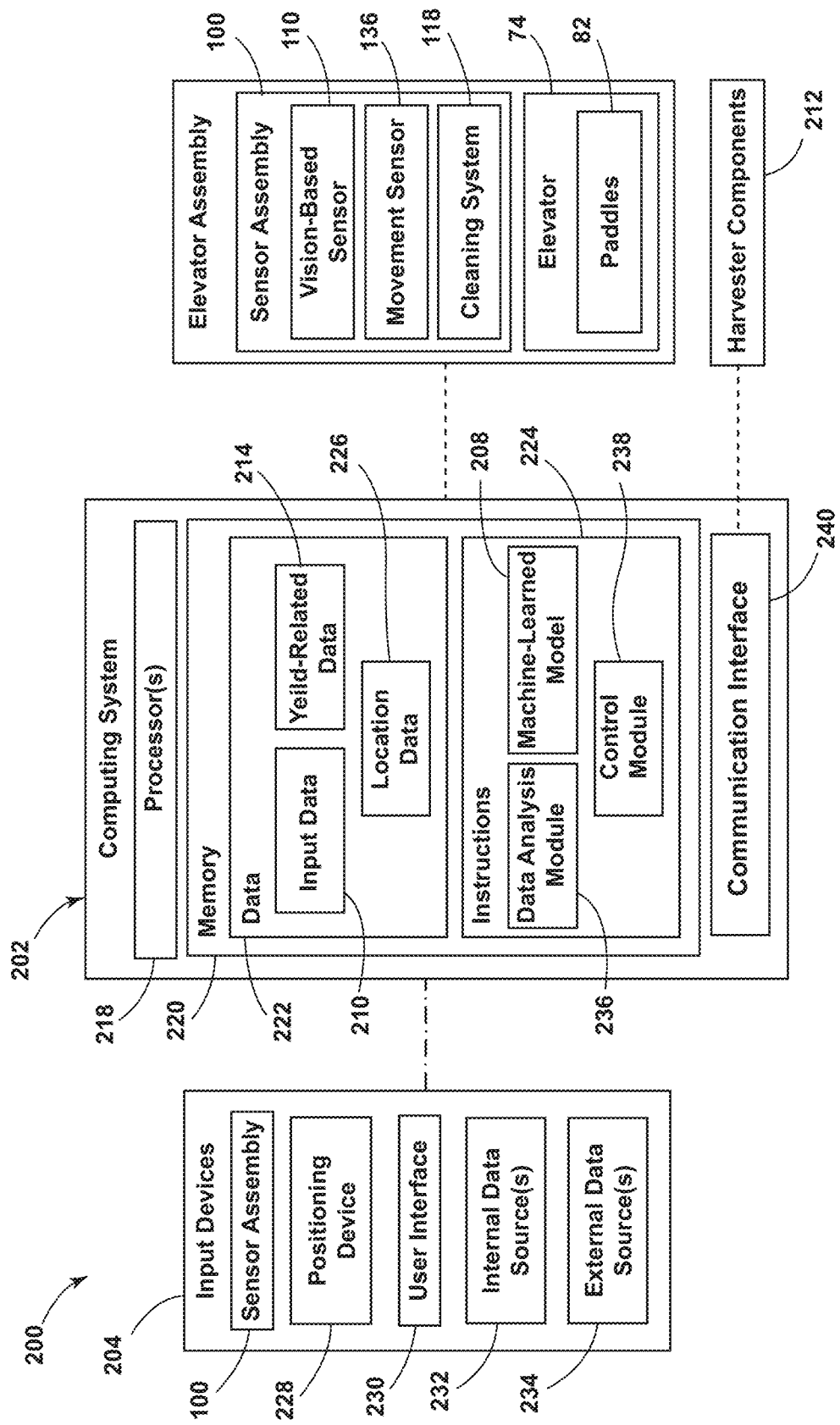
FIG. 4 illustrates a schematic view of a computing system for a harvesting operation in accordance with aspects of the present subject matter.
Figure 5:
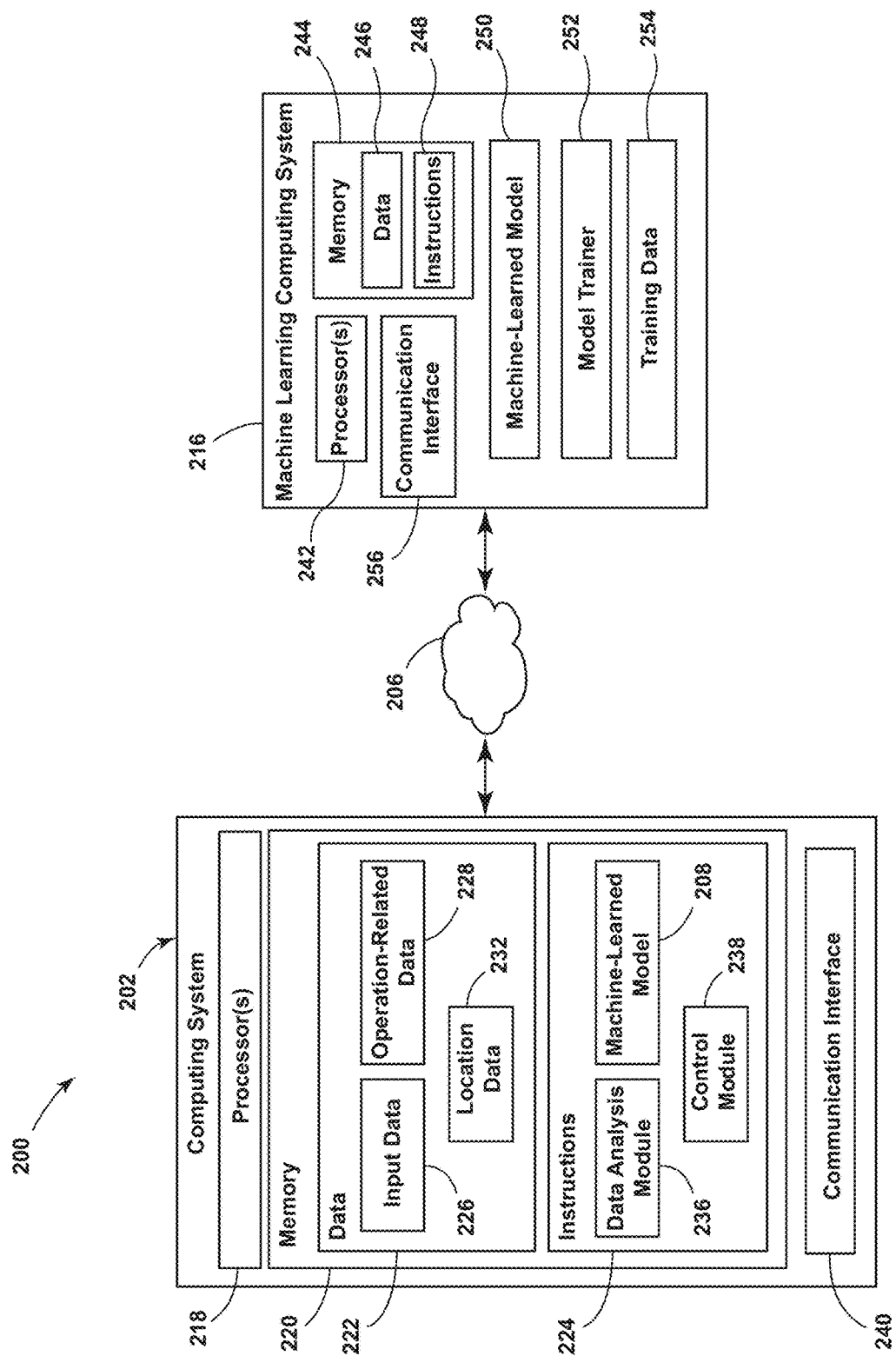
FIG. 5 is a schematic block diagram illustrating portions of the system of FIG. 4 in accordance with aspects of the present subject matter.

Referring now to FIGS. 4 and 5, schematic views of embodiments of a system 200 are illustrated in accordance with aspects of the present subject matter. In general, the system 200 will be described herein with reference to the harvester 10 described above with reference to FIGS. 1-3. However, it will be appreciated that the disclosed system 200 may generally be utilized with harvesters having any suitable harvester configuration.

In several embodiments, the system 200 may include the computing system 202 and various other components 212 configured to be communicatively coupled to and/or controlled by the computing system 202, such as various input devices 204 and/or various components 212 of the harvester 10. In some embodiments, the computing system 202 is physically coupled to the harvester 10. In other embodiments, the computing system 202 is not physically coupled to the harvester 10 and instead may communicate with the harvester 10 over a network 206.

As will be described in greater detail below, the computing system 202 may be configured to leverage a machine-learned model 208 to determine one or more yield-related parameters for an agricultural harvester 10 (e.g., a mass flow rate through the harvester 10, a stalk mass harvested during a defined time period, a productivity of the harvester 10, an amount of harvested product, etc.) based on input data that is related, for instance, to one or more operation-related conditions associated with the harvester 10. In particular, FIG. 4 illustrates a computing environment in which the computing system 202 can operate to determine the yield-related parameter based on input data 210 received, for example, from one or more input devices 204 and, further, to initiate one or more control actions associated with a harvester 10, such as by controlling one or more electronically controlled components 212 of the harvester 10 (e.g., an engine, transmission, hydraulic system components, material processing system components, a user interface 230, etc.) based on the yield-related data 214. That is, FIG. 4 illustrates a computing environment in which the computing system 202 is actively used in conjunction with a harvester 10 (e.g., during the operation of the harvester 10 within a field 24 (FIG. 1)). As will be discussed further below, FIG. 5 depicts a computing environment in which the computing system 202 can communicate over the network 206 with a machine learning computing system 216 to train and/or receive a machine-learned model 208. Thus, FIG. 5 illustrates the operation of the computing system 202 to train a machine-learned model 208 and/or to receive a trained machine-learned model 208 from a machine learning computing system 216 (e.g., FIG. 5 shows the "training stage") while FIG. 4 illustrates the operation of the computing system 202 to use the machine-learned model 208 to actively determine a yield-related parameter(s) for the harvester 10 (e.g., FIG. 4 shows the "inference stage").

Referring first to FIG. 4, in general, the computing system 202 may correspond to any suitable processor-based device(s), such as a computing device or any combination of computing devices. Thus, as shown in FIG. 4, the computing system 202 may generally include one or more processor(s) 218 and associated memory devices 220 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application-specific integrated circuit, and other programmable circuits. Additionally, the memory 220 may generally comprise memory element(s) including, but not limited to, computer-readable medium (e.g., random access memory (RAM)), computer-readable non-volatile medium (e.g., a flash memory), a floppy disk, a compact disc-read only memory (CD-ROM), a magneto-optical disk (MOD), a digital versatile disc (DVD) and/or other suitable memory elements. Such memory 220 may generally be configured to store information accessible to the processor(s) 218, including data 222 that can be retrieved, manipulated, created, and/or stored by the processor(s) 218 and instructions 224 that can be executed by the processor(s) 218.

In several embodiments, the data 222 may be stored in one or more databases. For example, the memory 220 may include an input database 210 for storing input data received from the input device(s) 204. For example, the input device(s) 204 may include the sensor assembly 100 coupled with the elevator assembly 62 and/or one or more other sensor assemblies 100 configured to monitor one or more parameters and/or conditions associated with the harvester 10 and/or the operation being performed therewith (e.g., including one or more of the various sensors 102, 104, 106, 108, 110 described above), one or more positioning device(s) 228 for generating position data associated with the location of the harvester 10, one or more user interfaces 230 for allowing operator inputs to be provided to the computing system 202 (e.g., buttons, knobs, dials, levers, joysticks, touch screens, and/or the like), one or more other internal data sources 232 associated with the harvester 10 (e.g., other devices, databases, etc.), one or more external data sources 234 (e.g., a remote computing device or sever, including, for instance, the machine-learning computing system 216 of FIG. 5), and/or any other suitable input device(s) 204. The data received from the input device(s) 204 may, for example, be stored within the input database 210 for subsequent processing and/or analysis.

In several embodiments, the computing system 202 may be configured to receive data from the input device(s) 204 that is associated with one or more "operation-related" conditions. The operation-related condition data may, for example, be: based directly or indirectly on sensor data received from the sensor assemblies 100 and/or the location data received from the positioning device(s) 228; calculated or determined by the computing system 202 based on any data accessible to the system 200 (e.g., including data accessed, received, or transmitted from internal data sources 232 and/or external data sources 234); received from the operator (e.g., via the user interface 230); and/or the like. As indicated above, operation-related conditions may include, but are not limited to, harvest-related parameters and/or settings of the harvester 10 (e.g., sensed or calculated harvest-related parameters or operator-selected settings), vehicle commands for the harvester 10, vehicle configuration parameters, application-related parameters, field-related parameters, and/or the like. For instance, examples of operation-related conditions include, but are not limited to, engine speed, ground speed, elevator speed, base cutter height, base cutter pressure, chopper speed, chopper pressure, floating roller position or displacement, the vertical position or travel of the chassis or frame, the fan speed associated with the primary and/or secondary extractor, hydraulic motor usage, foliage proportion, base cutter direction (forward or reverse), raising or lowering of the topper assembly, raising or lowering of the suspension, the model/type of the chopper assembly, the size of the elevator assembly 62, tire/track parameters, the region 84 within which the harvester 10 is operating, farm-specific conditions, time-related conditions (day/night), humidity data, field NDVI data, yield prediction data, soil analysis data, and/or the like.

It will be appreciated that, in addition to being considered an input device(s) 204 that allows an operator to provide inputs to the computing system 202, the user interface 230 may also function as an output device. For instance, the user interface 230 may be configured to allow the computing system 202 to provide feedback to the operator (e.g., visual feedback via a display or other presentation device, audio feedback via a speaker or other audio output device, and/or the like).

Additionally, as shown in FIG. 4, the memory 220 may include a yield-related database 214 for storing information or data associated with the yield-related parameter(s) for the harvester 10. For example, as indicated above, based on the input data received from the input device(s) 204, the computing system 202 may be configured to estimate or calculate one or more yield-related parameters associated with the harvester 10, such a mass of the harvested stalks 60S through the harvester 10 during a defined time period. The yield-related parameter(s) estimated or calculated by the computing system 202 may then be stored within the yield-related database 214 for subsequent processing and/or analysis.

Moreover, in several embodiments, the memory 220 may also include a location database 226 storing location information about the harvester 10 and/or information about the field 24 (FIG. 1) being processed (e.g., a field map). Such location database 226 may, for example, correspond to a separate database or may form part of the input database 210. As shown in FIG. 4, the computing system 202 may be communicatively coupled to the positioning device(s) 228 installed on or within the harvester 10. For example, the positioning device(s) 228 may be configured to determine the exact location of the harvester 10 using a satellite navigation position system (e.g., a GPS, a Galileo positioning system, the Global Navigation satellite system (GLONASS), the BeiDou Satellite Navigation and Positioning system, and/or the like). In such an embodiment, the location determined by the positioning device(s) 228 may be transmitted to the computing system 202 (e.g., in the form of coordinates) and subsequently stored within the location database 226 for subsequent processing and/or analysis.

Additionally, in several embodiments, the location data stored within the location database 226 may also be correlated to all or a portion of the input data stored within the input database 210. For instance, the location coordinates derived from the positioning device(s) 228 and the data received from the input device(s) 204 may both be time-stamped. In such an embodiment, the time-stamped data may allow the data received from the input device(s) 204 to be matched or correlated to a corresponding set of location coordinates received from the positioning device(s) 228, thereby allowing the precise location of the portion of the field 24 (FIG. 1) associated with the input data to be known (or at least capable of calculation) by the computing system 202.

Moreover, by matching the input data to a corresponding set of location coordinates, the computing system 202 may also be configured to generate or update a corresponding field map associated with the field 24 (FIG. 1) being processed. For example, in instances in which the computing system 202 already includes a field map stored within its memory 220 that includes location coordinates associated with various points across the field 24 (FIG. 1), the input data received from the input device(s) 204 may be mapped or correlated to a given location within the field map. Alternatively, based on the location data and the associated image, the computing system 202 may be configured to generate a field map for the field 24 (FIG. 1) that includes the geo-located input data associated therewith.

Likewise, any yield-related parameter derived from a particular set of input data (e.g., a set of input data received at a given time or within a given time period) can also be matched to a corresponding set of location coordinates. For example, the particular location data associated with a particular set of input data can simply be inherited by any yield-related data produced on the basis of or otherwise derived from such set of input data 210. Thus, based on the location data and the associated yield-related data, the computing system 202 may be configured to generate a field map for the field 24 (FIG. 1) that describes, for each analyzed portion of the field 24 (FIG. 1), one or more corresponding yield-related parameter values, such as harvested material mass values and/or harvested stalk mass values. Such a map can be consulted to identify discrepancies in or other characteristics of the yield-related parameter at or among various granular locations within the field 24 (FIG. 1).

Referring still to FIG. 4, in several embodiments, the instructions 224 stored within the memory 220 of the computing system 202 may be executed by the processor(s) 218 to implement a data analysis module 236. In general, the data analysis module 236 may be configured to analyze the input data (e.g., a set of input data received at a given time or within a given time period or a subset of the data, which may be determined through a pre-processing method) to determine the yield-related parameter. In various examples, the data analysis module 236 can cooperatively operate with or otherwise leverage a machine-learned model 208 to analyze the input data 210 to determine the yield-related parameter. As an example, the data analysis module 236 can perform some or all of method 300 of FIG. 7.

Moreover, as shown in FIG. 4, the instructions 224 stored within the memory 220 of the computing system 202 may also be executed by the processor(s) 218 to implement a machine-learned model 208. In particular, the machine-learned model 208 may be a machine-learned mass estimation model, a machine-learned image processing model, and/or any other machine-learned model. The machine-learned model 208 can be configured to receive input data and process the data to determine one or more yield-related parameters associated with the harvesting operation being performed by the harvester 10, such as a stalk mass during a defined time of the harvesting operation. For example, in various instances, the instructions 224, when executed by the one or more processors, can configure the computing system to perform various operations. The operations can include obtaining data associated with one or more operation-related conditions, inputting the data into a machine-learned mass estimation model, and receiving a stalk mass as the output of the machine-learned mass estimation model for a defined time period. As provided herein, in some cases, the data may be an image that is captured by one or more vision-based sensors 110 operably coupled with an elevator assembly 62 of the harvester 10. The image can include one or more images of the harvested material on the elevator 74 within the elevator assembly 62. In addition, each of the one or more images can be respectively associated with a region 84 of the elevator 74. In some instances, a model, which can include a machine-learned image processing model, processes a first portion of the one or more images to determine a stalk mass of the harvested material within each of the one or more images and stores a count of a number of the one or more images within the second portion, which may increase processing speed. In addition, the model can calculate the stalk mass associated with each of the one or more images within the first portion and determine an estimated stalk mass for each of the one or more images within the second portion based on the images within the first portion. In various examples, the stalk mass for each of the one or more images within the second portion may be estimated to be equal to an average stalk mass of the stalk mass portion within the one or more images of the first portion. In turn, the system, through the model and/or any other method, may determine a total stalk mass of the harvested crop during a defined time period.

Referring still to FIG. 4, the instructions 224 stored within the memory 220 of the computing system 202 may also be executed by the processor(s) 218 to implement a control module 238. In various examples, the control module 238 may be configured to adjust the operation of the harvester 10 by controlling one or more components of the crop processing system 28, which may be based on the total stalk mass. For instance, in several embodiments, the control module 238 may be configured to automatically control the operation of one or more based at least in part on the yield-related parameter determined as a function of the input data. Thus, the system 200 can reactively manage various harvest-related parameters of the harvester 10 based on the value(s) of the yield-related parameter that is output, for instance, from the machine-learned mass estimation model 208. In addition to such automatic control of the harvester operation, the computing system 202 may also be configured to initiate one or more other control actions associated with or related to the yield-related parameter determined using the machine-learned model 208. In several embodiments, the computing system 202 may automatically control the operation of the user interface 230 to provide an operator notification associated with the determined yield-related parameter. For instance, the computing system 202 may control the operation of the user interface 230 in a manner that causes data associated with the determined yield-related parameter to be presented to the operator of the harvester 10, such as by presenting raw or processed data associated with the yield-related parameter including numerical values, graphs, maps, and/or any other suitable visual indicators.

Additionally, in some embodiments, the control action initiated by the computing system 202 may be associated with the generation of a yield map based at least in part on the values for the yield-related parameter output from the machine-learned model 208. For instance, as indicated above, the location coordinates derived from the positioning device(s) 228 and the yield-related data may both be time-stamped. In such an embodiment, the time-stamped data may allow each yield-related parameter value or data point to be matched or correlated to a corresponding set of location coordinates received from the positioning device(s) 228, thereby allowing the precise location of the portion of the field 24 (FIG. 1) associated with the value/datapoint to be determined by the computing system 202. The resulting yield map may, for example, simply correspond to a data table that maps or correlates each yield-related datapoint to an associated field location. Alternatively, the yield map may be presented as a geo-spatial mapping of the yield-related data, such as a heat map that indicates the variability in the yield-related parameter across the field 24 (FIG. 1).

Moreover, as shown in FIG. 4, the computing system 202 may also include a communications interface 240 to communicate with any of the various other system components described herein. For instance, one or more communicative links or interfaces (e.g., one or more data buses and/or wireless connections) may be provided between the communications interface 240 and the input device(s) 204 to allow data transmitted from the input device(s) 204 to be received by the computing system 202. Additionally, as shown in FIG. 3, one or more communicative links or interfaces (e.g., one or more data buses and/or wireless connections) may be provided between the communications interface 240 and one or more electronically controlled components of the elevator assembly 62 to allow the computing system 202 to control the operation of such system components.

In operation, the sensor assembly 100 may capture data associated with the movement of the elevator 74 during a harvesting operation. For example, the movement sensor 136 may detect movement of the one or more paddles 82 operably coupled with the elevator 74. In turn, each time a paddle 82 passes by the movement sensor 136, or at any other frequency, indicating a subsequent region 84 transporting harvest material has passed the movement sensor 136, the computing system 202 may activate the vision-based sensor 110 to generate an image associated with an imaged region 84 that includes the harvested material on the elevator 74. The harvested material may include stalks 60S, which may be in the form of billets 60B, and debris 64 (FIG. 1), which may include any object other than stalks 60S or billets 60B, which is positioned on the elevator 74 within the imaged region 84. The image is provided to the computing system 202, which inputs the image into one or more models (e.g., machine-learned models 208). The models may extract a mask from the image, segment the mask into segments based on one or more characteristics, classify each segment as stalks 60S or debris 64 (FIG. 1), and/or estimate the stalk mass within the imaged region 84. In some cases, less than all of the imaged regions 84 may be processed by the computing system 202. In such cases, the computing system 202 may store the number of instances that a paddle 82 passed the movement sensor 136 and correlate the stalk mass from the processed imaged regions 84 to the unprocessed image regions 84 to determine a total stalk mass processed by the harvester 10 during the harvesting operation and/or during a defined time period. For example, in some cases, the average stalk mass may be interpolated to the unprocessed images to generate an estimated stalk mass for those imaged regions 84. In turn, the computing system 202 may generate a total stalk mass and initiate a control action based at least partially on the total crop mass during the defined time period.

Referring now to FIG. 5, according to some aspects of the present disclosure, the computing system 202 can store or include one or more models, which may be machine-learned models 208. For example, the machine-learned model 208 may be a machine-learned mass estimation model. The machine-learned mass estimation model 208 can be configured to receive input data and process the input data to determine one or more yield-related parameters associated with the harvester 10, such as a production of the harvester 10 in the form of a stalk mass during a defined time period.

In some examples, the mass estimation model can correspond to a linear machine-learned model. For instance, the mass estimation model may be or include a linear regression model. A linear regression model may be used to intake the input data from the input device(s) 204 and provide an intermittent or continuous output for the yield-related parameter. Linear regression models may rely on various techniques, such as ordinary least squares, ridge regression, lasso, gradient descent, and/or the like. However, in other embodiments, the mass estimation model may be or include any other suitable linear machine-learned model.

Alternatively, the mass estimation model may correspond to a non-linear machine-learned model. For instance, the mass estimation model may be or include a neural network such as, for example, a convolutional neural network. Example neural networks include feed-forward neural networks, recurrent neural networks (e.g., long short-term memory recurrent neural networks), convolutional neural networks, transformer neural networks (or any other models that perform self-attention), or other forms of neural networks. Neural networks can include multiple connected layers of neurons and networks with one or more hidden layers, which can be referred to as "deep" neural networks. Typically, at least some of the neurons in a neural network include non-linear activation functions.

As further examples, the mass estimation model can be or can otherwise include various other machine-learned models, such as a support vector machine; one or more decision-tree based models (e.g., random forest models); a Bayes classifier; a K-nearest neighbor classifier; and/or other types of models including both linear models and non-linear models.

In some embodiments, the computing system 202 can receive the one or more machine-learned models 208 from the machine learning computing system 216 over the network 206 and can store the one or more machine-learned models 208 in the memory 220. The computing system 202 can then use or otherwise run the one or more machine-learned models 208 (e.g., by processor(s) 218).

The machine learning computing system 216 includes one or more processors 242 and a memory 244. The one or more processors 242 can be any suitable processing device such as described with reference to processor(s) 218. The memory 244 can include any suitable storage device such as described with reference to memory 220.

The memory 244 can store information that can be accessed by the one or more processors 242. For instance, the memory 244 (e.g., one or more non-transitory computer-readable storage mediums, memory devices) can store data 246 that can be obtained, received, accessed, written, manipulated, created, and/or stored. In some embodiments, the machine learning computing system 216 can obtain data from one or more memory device(s) that are remote from the system 216.

The memory 244 can also store computer-readable instructions 248 that can be executed by the one or more processors 242. The instructions 248 can be software written in any suitable programming language or can be implemented in hardware. Additionally, or alternatively, the instructions 248 can be executed in logically and/or virtually separate threads on the processor(s) 242.

For example, the memory 244 can store instructions 248 that when executed by the one or more processors 242 cause the one or more processors 242 to perform any of the operations and/or functions described herein.

In some embodiments, the machine learning computing system 216 includes one or more server computing devices. If the machine learning computing system 216 includes multiple server computing devices, such server computing devices can operate according to various computing architectures, including, for example, sequential computing architectures, parallel computing architectures, or some combination thereof.

In addition or alternatively to the model(s) 208 at the computing system 202, the machine learning computing system 216 can include one or more machine-learned models 250. For example, the model 250 can be the same as described above with reference to the model(s) 208.

In some embodiments, the machine learning computing system 216 can communicate with the computing system 202 according to a client-server relationship. For example, the machine learning computing system 216 can implement the machine-learned models 250 to provide a web-based service to the computing system 202. For example, the web-based service can provide data analysis for determining yield-related parameters as a service.

Thus, machine-learned models 208 can be located and used at the computing system 202, and/or machine-learned models 250 can be located and used at the machine learning computing system 216.

In some embodiments, the machine learning computing system 216 and/or the computing system 202 can train the machine-learned models 208 and/or 250 through the use of a model trainer 252. The model trainer 252 can train the machine-learned models 208 and/or 250 using one or more training or learning algorithms. One example training technique is the backwards propagation of errors ("back propagation"), or other training techniques can be used.

In some embodiments, the model trainer 252 can perform supervised training techniques using a set of training data 254. For example, the training data 254 can include input data from the input device(s) 204 that is associated with a known value for the target parameter (e.g., a crop mass correlation for an area of an image that includes harvest material, a crop mass correlation for an area of an image that includes stalk 60S, etc.). For instance, input data associated with the training dataset may be continuously collected, generated, and/or received while the yield-related parameter is being monitored via a separate yield monitoring means to provide matching or correlation datasets between the input data and the yield-related data. In other embodiments, the model trainer 252 can perform unsupervised training techniques. The model trainer 252 can perform several generalization techniques to improve the generalization capability of the models being trained. Generalization techniques include weight decays, dropouts, or other techniques. The model trainer 252 can be implemented in hardware, software, firmware, or combinations thereof.

Thus, in some embodiments, the models can be trained at a centralized computing system (e.g., at "the factory") and then distributed to (e.g., transferred to for storage by) specific controllers. Additionally or alternatively, the models can be trained (or re-trained) based on additional training data generated by users of the system. This process may be referred to as the "personalization" of the models and may allow users to further train the models to provide improved (e.g., more accurate) predictions for unique field and/or machine conditions experienced by such users.

The network(s) 280 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof and can include any number of wired or wireless links. Communication over the network(s)

280 can be accomplished, for instance, via a communications interface using any type of protocol, protection scheme, encoding, format, packaging, etc.

The machine learning computing system 216 may also include a communications interface 256 to communicate with any of the various other system components described herein.

FIGS. 4 and 5 illustrate example computing systems that can be used to implement the present disclosure. Other computing systems can be used as well. For example, in some embodiments, the computing system 202 can include the model trainer 252 and the training dataset 254. In such embodiments, the machine-learned models 208 can be both trained and used locally at the computing system 202. As another example, in some embodiments, the computing system 202 is not connected to other computing systems.

Figure 6:
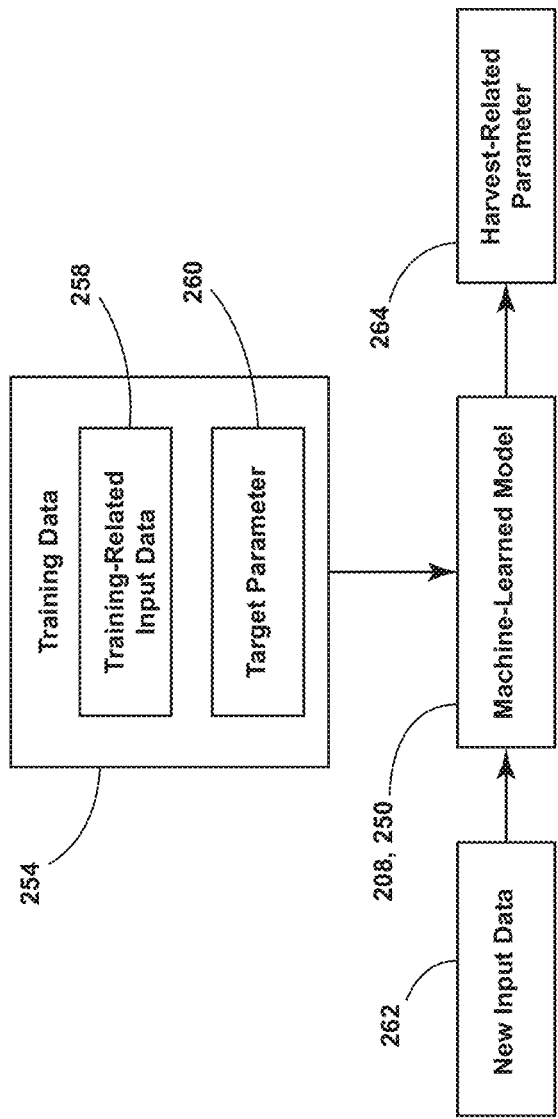
FIG. 6 illustrates a schematic view of a flow diagram for training a machine-learned model in accordance with aspects of the present subject matter.

Referring now to FIG. 6, a schematic view illustrating a flow diagram for training a machine-learned model, such as the machine-learned mass estimation models 208, 250 described above, is illustrated in accordance with aspects of the present subject matter. As indicated above, the model(s) 208, 250 can be trained by a model trainer 252 that uses training data 254 and performs any suitable supervised and/or unsupervised training techniques. In several embodiments, as shown in FIG. 6, the model(s) 208, 250 may be trained using one or more training datasets including input data 258 that is associated with a known value for the target parameter 260 (i.e., the yield-related parameter). For instance, the input data 258 associated with the training dataset may be continuously collected, generated, and/or received (e.g., via the input device(s) 204) while both an agricultural harvester 10 is performing a harvesting operation within the field 24 (FIG. 1) and the target yield-related parameter 260 is being monitored via a separate yield monitoring means (e.g., by using a conventional yield monitoring system that relies upon a sensorized load plate within the elevator assembly 62 to monitor, for example, the mass flow rate through the elevator 74).

By analyzing the input data 258 in combination with the known or target parameters 260 for the yield-related parameter derived from the separate yield monitoring methods, suitable correlations may be established between the input data (including certain subsets of the input data) and the yield-related parameter to develop a machine-learned model that can accurately predict the yield-related parameter based on new datasets including the same type of input data. For instance, in some implementations, suitable correlations may be established between the yield-related parameter and various operation-related conditions associated with or included within the input data, such as various sensed, calculated, and/or known parameters, settings, machine configurations, and/or operational statuses associated with the harvester 10 (e.g., harvest material mass, stalk mass, foliage ration (i.e., ratio of stalk mass to debris mass), engine speed, ground speed, elevator speed, base cutter height, base cutter pressure, chopper speed, chopper pressure, floating roller position or displacement, the vertical position or travel of the chassis or frame, the fan speed associated with the primary and/or secondary extractor, hydraulic motor usage, base cutter direction (forward or reverse), whether the topper assembly or suspension is being currently raised or lowered, the model/type of the chopper assembly, the size of the elevator assembly 62, tire/track parameters, and/or the like). As indicated above, in addition to using such harvester-based, operation-related conditions to establish the desired correlations (or as an alternative thereto), suitable correlations may also be established between the yield-related parameter and various other operation-related conditions, such as field-based or application-based operation-related conditions (e.g., conditions specific to the region 84 within which the harvester 10 is operating, farm-specific conditions, time-related conditions (day/night), humidity data, field NDVI data, yield prediction data, soil analysis data, and/or the like).

As shown in FIG. 6, once the machine-learned model has been trained, new datasets 254 can be input into the model to allow the model to predict or determine new estimated values 264 for the target yield-related parameter. For instance, upon training the model, the input data collected, generated, and/or received during a subsequent harvesting operation can be input into the model to provide yield-related data associated with such harvesting operation. For instance, the model may be used to predict or determine values for the yield-related parameter at a given frequency (e.g., the frequency at which new input data is being received) to allow such parameter to be continuously monitored as the harvesting operation is being conducted. As indicated above, such yield-related data may then be used by the system 200 to present yield information to the operator (e.g., via the user interface 230), to generate an associated field map (e.g., a yield map), to automatically control the operation of the harvester 10, and/or to execute any other suitable control actions.

Figure 7:
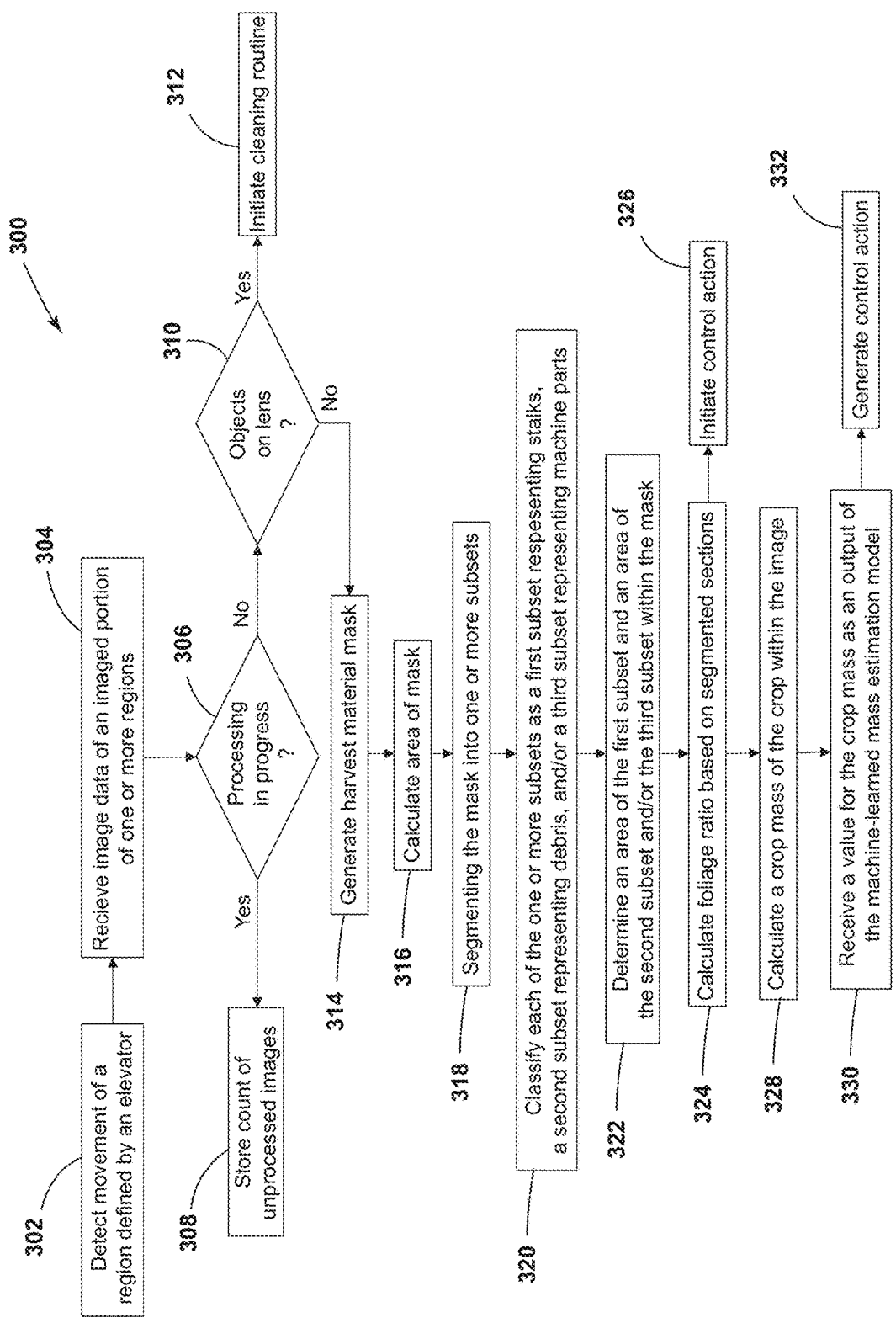
FIG. 7 illustrates a flow diagram of a method for a harvesting operation in accordance with aspects of the present subject matter.

Referring now to FIG. 7, a flow diagram of a method 300 for operating an agricultural harvester is illustrated in accordance with aspects of the present subject matter. In general, the method 300 will be described herein with reference to the agricultural harvester 10 and related components described with reference to FIGS. 1-3, and the various components of the system 200 described with reference to FIGS. 4-6. It will be appreciated, however, that the disclosed method 300 may be implemented with harvesters having any other suitable configurations and/or within systems having any other suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 7, at (302), the method 300 may include detecting a movement step of a defined region associated with an area proximate to an elevator of the harvester by a sensor assembly. The region may be accomplished when the elevator translates a defined length. For example, the step length may be a length that is defined between successive paddles attached to the elevator. As provided herein, the sensor assembly may include a movement sensor (e.g., a proximity sensor) that is capable of detecting the movement of the paddles. As such, in some instances, as each paddle passes the movement sensor, subsequent regions may pass the movement sensor. However, it will be appreciated that each region may be defined by any other length and/or amount of time, which may be detected in any other manner without departing from the teachings provided herein.

At (304), the method 300 includes receiving input data, which may be in the form of one or more images of defined regions associated with a respective area proximate to an elevator. As provided herein, the harvested material may include an amount of debris and an amount of stalk. As indicated above, a computing system may be communicatively coupled to a sensor assembly and include one or more vision-based sensors thereby allowing images captured by the vision-based sensors to be transmitted to and received by the computing system. In several embodiments, the method 300 may further include performing one or more preprocessing operations that are configured to smooth or otherwise filter the image. For example, the preprocessing operations may include single-instruction, multiple-data (SIMD), and other parallel processing techniques that may be used to process the image.

At (306), the method 300 can include determining whether the computing system is processing a previously captured image. In some cases, processing of each image may be completed during an amount of time that exceeds the amount of time between subsequently captured images of regions of the elevator. In instances in which processing is in progress, the method 300, at (308), can include counting and storing the image associated with the unprocessed image of a region. For example, in some cases, a first image, a third image, and a sixth image may be processed while a second image, a fourth image, and a fifth image may be stored and counted such that three images are processed, three images are counted/stored, and six images were acquired during a defined time period indicating that the stalk material of the six regions would equate to the harvest stalk mass during the defined time period.

If the processing of the previous image is not in progress, at (310), the method 300 can include determining whether a proportion of the lens has objects adhered thereto that exceeds the defined threshold, which may be determined by a model (e.g., a machine-learned model). If the proportion of the lens has objects adhered thereto exceeds the defined threshold, at (312), the method 300 can include initiating a cleaning routine. The cleaning routine may include providing information to a user interface in the form of a suggestion to clean the lens. Additionally or alternatively, the cleaning routine can include activating a liquid pump to direct fluid from a liquid tank through a liquid nozzle and towards the lens of the vision-based sensor. Additionally or alternatively, the cleaning routine can include activating an air pump to direct air through an air nozzle and towards the lens.

Figure 8:
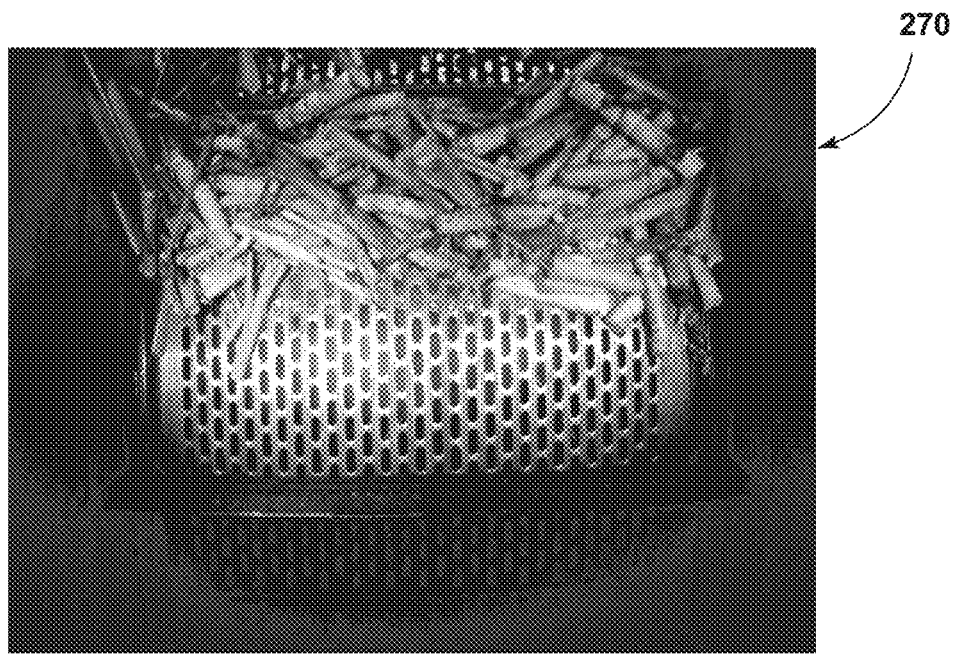
FIG. 8 illustrates an image of a region proximate to an elevator of the harvester in accordance with aspects of the present subject matter.
Figure 9:
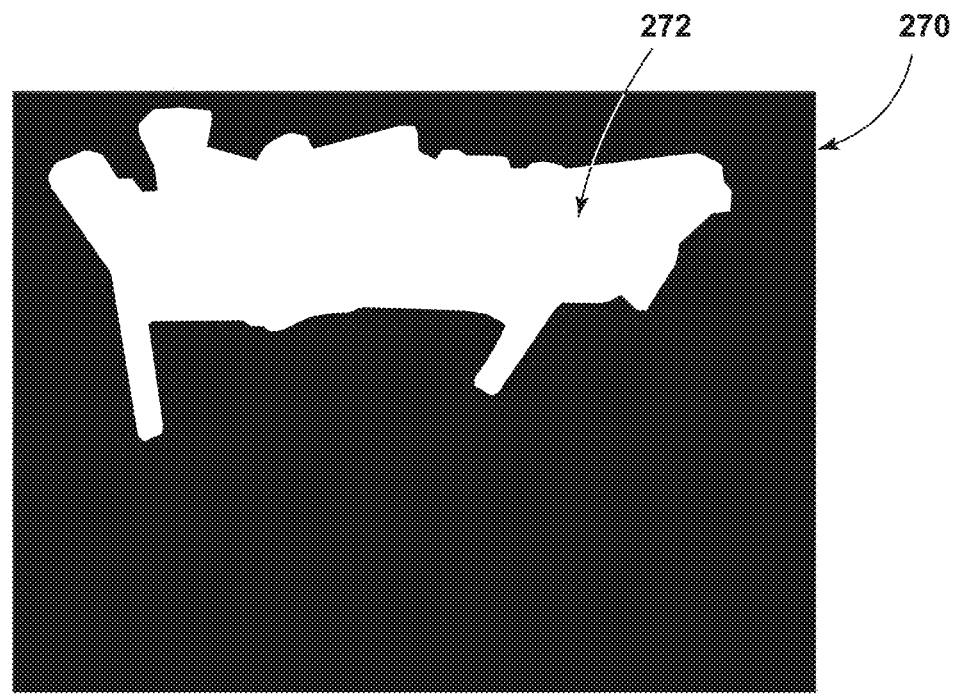
FIG. 9 illustrates a mask of a portion of the image of FIG. 8 in accordance with aspects of the present subject matter.

If the proportion of the lens has objects adhered thereto exceeds the defined threshold, the method 300, at (314), can include generating a harvested material mask. For example, the method 300 can include analyzing the image using one or more image processing algorithms to distinguish harvested material from all remaining objects within the image to classify each pixel within the image as a harvested material pixel or a non-harvested material pixel. For instance, FIG. 8 illustrates an example image 270 of the region and FIG. 9 illustrates a harvested material mask 272 associated with the image 270 in which the non-harvested material pixels are shaded and the harvested material pixels are unshaded.

It will be appreciated that the method 300 can utilize any suitable image processing algorithm(s) to distinguish harvested material (or any other object) within each image being processed. In various examples, the method 300 may utilize a machine-learned model to analyze the image to determine the harvested material mask 272, which may include a semantic segmentation algorithm. In some embodiments, a texture-based algorithm may be utilized that relies on the orientations of image gradients to differentiate a harvested material pixel from a non-harvested material pixel. Specifically, harvested material regions may be characterized by a high number of gradients in the same direction due to the straightness of the stalks (e.g., billets), whereas non-harvested material may be more randomly oriented. Thus, by identifying the gradient orientations within the image, the pixels can be analyzed and classified as harvested material pixels. In other embodiments, a color-based algorithm may be utilized that relies on color differences to differentiate between harvested material pixels and non-harvested material pixels. In further embodiments, the method 300 may utilize a model that identifies the differences in the reflectivity or spectral absorption between the harvested material and the non-harvested material contained within the image.

As shown in FIG. 7, at (316), the method 300 can include determining an area of the mask 272 of the image. For example, as shown in FIG. 9, the mask 272 may generally correlate to about 25% of the image. In various examples, the method 300 can utilize any suitable image processing algorithm(s) to determine the area of the mask 272.

Figure 10:
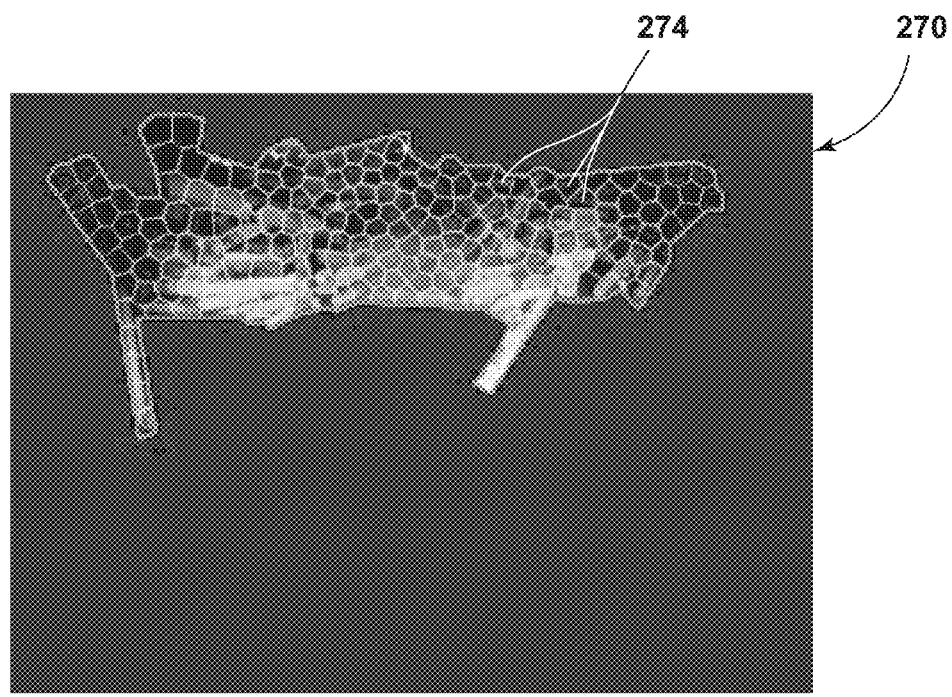
FIG. 10 illustrates a plurality of segments within the mask of FIG. 9 in accordance with aspects of the present subject matter.

Referring further to FIG. 7, at (318), the method 300 can include segmenting, with the computing system, the harvested material mask into one or more subsets, which may be accomplished with a computer vision/machine learning based model, such as a super pixel-based algorithm. In various examples, the one or more subsets can include a first subset representing the stalks within the harvested material, a second subset representing the debris within the harvested material, and/or a third subset representing the remaining machine parts (i.e., a portion of the selected mask that is not a harvested material). For instance, FIG. 10 illustrates a plurality of subsets 274 overlaid on the mask 272.

Referring back to FIG. 7, at (320), the method 300 can include classifying each of the one or more subsets 274 as a first subset representing stalk (e.g., billets, etc.), a second subset representing debris (e.g., dust, dirt, leaves, etc.), and/or a third subset representing machine parts. As provided above, the method 300 can utilize any suitable image processing algorithm(s) to distinguish harvested material (or any other object) within the harvest mask being processed. In various examples, the method 300 may utilize a machine-learned model to analyze the image to classify each pixel within the harvested material mask. In some embodiments, a texture-based algorithm may be utilized that relies on the orientations of image gradients to differentiate a stalk pixel from a debris pixel. Specifically, stalk sections may be characterized by a high number of gradients in the same direction due to the straightness of the stalk (e.g., billets), whereas debris may be more randomly oriented. Thus, by identifying the gradient orientations within the image, the pixels can be analyzed and classified as stalk pixels. In other embodiments, a color-based algorithm may be utilized that relies on color differences to differentiate between stalk pixels and debris pixels. In further embodiments, the method 300 may utilize a model that identifies the differences in the reflectivity or spectral absorption between the stalk and the debris contained within the mask.

At (322), the method 300 can include determining an area of the first subset (e.g., stalk pixels (and/or a number of stalk pixels)) within the mask, an area of the second subset (e.g., debris pixels (and/or a number of debris pixels)) within the mask, and/or an area of the third subset (e.g., machine part pixels (and/or a number of machine part pixels)) within the mask. At (324), the method 300 can include calculating a foliage ratio, which may be defined as a metric indicative of an amount of debris relative to an amount of billets within the mask. The foliage ratio may be an average over the defined time period. Based on the foliage ratio, at (326), the method 300 can include initiating a control action for the agricultural harvester based at least in part on the foliage ratio. For example, the control action may include, but is not limited to, presenting data associated with the foliage ratio to the operator via the user interface, generating a yield map based at least in part on the foliage ratio, and/or automatically controlling the operation of a component of the harvester based at least in part on the foliage ratio.

At (328), the method 300 can include calculating, through the model and/or an additional model (which may be a machine-learned model), a stalk mass of the harvested material based on the amount of pixels within each subset. In various embodiments, the area of the mask within the image and/or the area of stalk pixels (and/or the number of stalk pixels) within the mask may be inputted into a model, which may be a machine-learned model, which is trained based on the method described with reference to FIG. 6. As indicated above, the model can be trained by a model trainer that uses training data and performs any suitable supervised and/or unsupervised training techniques. In several embodiments, as shown in FIG. 6, the model may be trained using one or more training datasets including input data that is associated with a known value for the target parameter (i.e., the stalk mass within an image). For instance, the image associated with the training dataset may be continuously collected, generated, and/or received (e.g., via the sensor assembly) while both an agricultural harvester is performing a harvesting operation within the field and the stalk mass is being monitored via a separate mass monitoring means (e.g., by using a sensorized load plate within the elevator assembly to monitor, for example, the stalk mass at the time the image is collected). Additionally or alternatively, controlled masses of harvested material may be placed into the harvester and used as the training data. By analyzing the input data in combination with the known or target values for the stalk mass derived from the separate mass monitoring methods, suitable correlations may be established between the image (including certain subsets of the image) and the stalk mass to develop a machine-learned model that can accurately predict the stalk mass based on new datasets including the same type of image.

Referring back to FIG. 7, at (330), the method 300 can include receiving a value for the stalk mass as an output of the machine-learned mass estimation model. Specifically, the machine-learned model may be configured to output a numerical value for the stalk mass based on the data (e.g., image(s) and other data) input into the model, such as by outputting a numerical value for the stalk mass within the harvested materials that are harvested during the defined time period. For instance, with reference to the example provided above in which a first image, a third image, and a sixth image may be processed while a second image, a fourth image, and a fifth image were stored and counted such that three images are processed while storing the six images that were acquired during a defined time period, the stalk mass from the first image, the third image, and the sixth image may be determined and summed. In addition, an average stalk mass of the processed images may be calculated. The average stalk mass may be multiplied by the number of stored, unprocessed images (i.e., the second image, the fourth image, and the fifth image) to estimate a total stalk mass for the unprocessed images. Next, the stalk mass from each of the processed images may be added to the total stalk mass for the unprocessed images to determine an estimated stalk mass for the defined time period.

Figure 11:
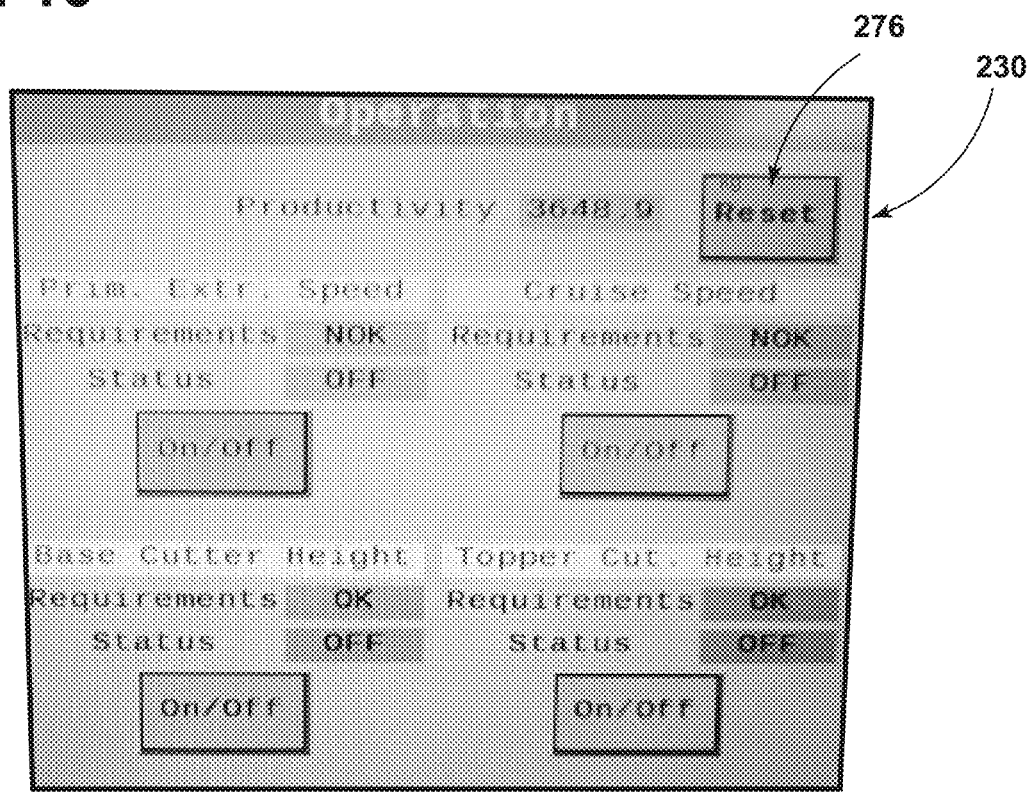
FIG. 11 illustrates an example user interface in accordance with aspects of the present subject matter.

At (332), the method 300 can include initiating a control action for the agricultural harvester based at least in part on the foliage ratio. For example, as illustrated in FIG. 11, the control action may include, but is not limited to, presenting data associated with the stalk mass to the operator via the user interface. Moreover, a response action may be initiated based on the control action. For instance, a user may utilize an input 276 on the user interface (or in any other location) to reset the defined time period, which in turn recalculates the stalk mass during the subsequent defined time period. When the first time period ends, the stalk mass calculated during that time period may be stored within the computing system and/or provided to one or more remote devices. Additionally or alternatively, the control action may include, but is not limited to, generating a yield map based at least in part on the stalk mass, and/or automatically controlling the operation of a component of the harvester based at least in part on the stalk mass.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for an agricultural harvester, the system comprising:
    one or more processors; and
    one or more non-transitory computer-readable media that collectively store:

a machine-learned mass estimation model configured to receive data associated with one or more operation-related conditions for an agricultural harvester and process the data to determine an output indicative of a stalk mass for the agricultural harvester; and
instructions that, when executed by the one or more processors, configure the system to perform operations, the operations comprising:
obtaining the data associated with one or more operation-related conditions;
inputting the data into the machine-learned mass estimation model; and
receiving a stalk mass as the output of the machine-learned mass estimation model for a defined time period.

2. The system of claim 1, wherein the operations further comprise:
initiating a control action for the agricultural harvester based at least in part on the stalk mass.

3. The system of claim 2, wherein initiating the control action comprises at least one of:
causing data associated with the stalk mass to be presented to an operator via a user interface of the agricultural harvester;
generating a yield map based at least in part on the stalk mass; or
automatically controlling an operation of a component of the agricultural harvester based at least in part on the stalk mass.

4. The system of claim 3, wherein the data comprises an image that is captured by one or more vision-based sensors operably coupled with an elevator assembly.

5. The system of claim 4, wherein the image includes one or more images of a harvested material including a stalk and a debris on an elevator within the elevator assembly, and wherein each of the one or more images is associated with a region of the elevator.

6. The system of claim 5, wherein the model processes a first portion of the one or more images to determine the stalk mass of the stalk of the harvested material within each of the one or more images and stores a count of a number of the one or more images within a second portion including one or more unprocessed images.

7. The system of claim 6, wherein the model calculates the stalk mass associated with each of the one or more images within the first portion and an estimated stalk mass for each of the one or more images within the second portion.

8. The system of claim 7, wherein the estimated stalk mass for each of the one or more unprocessed images within the second portion is equal to an average stalk mass of the stalk mass portion within the one or more images of the first portion.

9. A computer-implemented method for agricultural harvesting, the computer-implemented method comprising:
receiving, by a computing system, a first image including a harvested material being represented by a plurality of pixels, the harvested material including debris and stalks, wherein the first image is associated with a first region of an elevator for an agricultural harvester;
generating, with the computing system, a harvested material mask;
segmenting, by the computing system, the harvested material mask into one or more subsets through a model; and
calculating, through the model, a stalk mass of the harvested material based on an amount of pixels within each of the one or more subsets.

10. The computer-implemented method of claim 9, further comprising:
detecting movement of the elevator; and
capturing, with a vision-based sensor, the first image based on the movement of the elevator.

11. The computer-implemented method of claim 10, wherein the movement is monitored by a movement sensor, and wherein the first region is defined between first and second paddles operably coupled with the elevator.

12. The computer-implemented method of claim 9, further comprising:
generating a harvested material mask, wherein a first subset of the mask represents harvested material pixels positioned within the harvested material mask.

13. The computer-implemented method of claim 9, further comprising:
estimating a stalk mass for a second region based on the stalk mass of the first region.

14. The computer-implemented method of claim 13, further comprising:
determining, with the computing system, a total stalk mass of the first region and the second region; and
generating a control action based on the total stalk mass.

15. The computer-implemented method of claim 14, wherein the control action comprises at least one of:
causing data associated with the stalk mass to be presented to an operator via a user interface of the agricultural harvester;
generating a yield map based at least in part on the stalk mass; or
automatically controlling an operation of a component of the agricultural harvester based at least in part on the stalk mass.

16. A system for an agricultural harvester, the system comprising:
a frame;
a material processing system supported relative to the frame and configured to process a flow of harvested material;
a sensor assembly configured to capture image associated with the harvested material; and
a computing system including one or more processors and one or more non-transitory computer-readable media that collectively store instructions that, when executed by the one or more processors, configure the computing system to perform operations, the operations comprising:
obtaining the image associated with one or more operation-related conditions; and
determining a stalk mass of the harvested material.

17. The system of claim 16, wherein determining the stalk mass of the stalk of the harvested material includes calculating the stalk mass based on a model, wherein a proportion of pixels within the image that corresponds to the stalk of the harvested material is an input of the model.

18. The system of claim 16, wherein the operations further comprise:
detecting one or more objects on a lens of a vision-based sensor of the sensor assembly.

19. The system of claim 18, wherein the operations further comprise:
determining, with the computing system, a proportion of the lens having objects adhered thereto; and
initiating, with the computing system, a cleaning routine when the proportion exceeds a defined threshold.

20. The system of claim 19, wherein the operations further comprise:

generating a control action based on the stalk mass of the stalk during the defined time period.

* * * * *